United States Patent [19]

Aoyama et al.

[11] Patent Number: 4,780,811
[45] Date of Patent: Oct. 25, 1988

[54] VECTOR PROCESSING APPARATUS PROVIDING VECTOR AND SCALAR PROCESSOR SYNCHRONIZATION

[75] Inventors: Tomoo Aoyama; Hiroshi Murayama, both of Hadano, Japan

[73] Assignees: Hitachi, Ltd.; Hitachi Computer Eng. Co., Tokyo, Japan

[21] Appl. No.: 881,403

[22] Filed: Jul. 2, 1986

[30] Foreign Application Priority Data

Jul. 3, 1985 [JP] Japan .................................. 60-144798

[51] Int. Cl.[4] .......................................... G06F 15/347
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,149,243 | 4/1979 | Wallis | 364/200 |
| 4,395,757 | 7/1983 | Bievenu et al. | 364/200 |
| 4,541,046 | 9/1985 | Nagashima et al. | 364/200 |
| 4,661,900 | 4/1987 | Chen et al. | 364/200 |

OTHER PUBLICATIONS

T. Odaka et al., "Hitachi Supercomputer S-810 Array Processor System", Elesevier Science Publishers B.V., 1986.

Briggs et al., *Computer Architecture and Parallel Processing*, McGraw-Hill, 1984, pp. 8.1, 9.6.

*Primary Examiner*—Raulfe B. Zache
*Assistant Examiner*—Leo Li Wang
*Attorney, Agent, or Firm*—Antonelli, Terry & Wands

[57] ABSTRACT

A vector processing apparatus includes a scalar processor for executing scalar instructions and a vector processor for executing vector instructions. The vector processing apparatus has status code registers (SCR) which can be referred to by both processors through a wait managing circuit. The scalar instructions each have an order assurance instruction to assure an order of execution, and the order assurance instruction and the vector instruction each have a field to designate an SCR. The wait managing circuit renders the execution of the instruction in the scalar processor or the vector processor to wait or enable in accordance with a set status or a reset status of the SCR designated by the instruction field, and sets or resets the SCR designated by the instruction field in response to the completion of execution of the instruction to control synchronization of the execution of instructions in both processors.

6 Claims, 5 Drawing Sheets

VECTOR PROCESSING APPARATUS PROVIDING VECTOR AND SCALAR PROCESSOR SYNCHRONIZATION

BACKGROUND OF THE INVENTION

The present invention relates to a vector processing apparatus having scalar and vector processors.

A prior art vector processor uses a scalar instruction for scalar processing and a vector instruction for vector processing. There are two methods to execute those two instructions.

In a first method, one logical unit decodes a hybrid system of the scalar instruction and the vector instruction. In this method, it is easy for a user to understand the programming structure of a program described by the scalar and vector instructions. In this method, floating point and fixed point registers can be shared by the scalar and vector processors so that data is exchanged between the processors at the register level. By sharing the registers, a scalar event directly interacts with the vectors and vice versa. From the standpoint of software, such as a compiler, depending on the order of access to the common registers, the scalar and vector instructions can be executed.

In a second method, the scalar instructions and the vector instructions are classified into two blocks, and the vector instructions in the block are sub-divided in the order of execution. The vector processor executes the sub-divided vector instructions. A logical combination of the vector instruction groups is designated by a vector processor start-up instruction, a set-up instruction or a vector processor status test instruction. In this method, the scalar instruction is decoded by a scalar processor and the vector instruction is decoded by a vector processor. This method has a higher freedom in parallel processing than the first method, and it is effective to attain a higher degree of parallel calculation. The second method is introduced by an article "Hitachi Supercomputer S-810 Array Processor System" by T. Odaka et al, "SUPERCOMPUTERS", Elesevier Science Publishers B. V., 1986.

In the second method, since the data is simultaneously processed by the scalar and vector processors, common registers cannot be used by the processors and the execution control between the processors by register numbers is not performed. From the standpoint of software which assumes conventional serial execution control, it makes debugging (logical validation) of code difficult. Further, unless sufficient communication means for status between the processors is provided, synchronous defects frequently occur when a serially structured algorithm is copied into parallel codes, and an expected performance is not attained. This means that processor synchronization control is particularly important when parallel hardware means are constructed to attain a high-speed vector processing.

SUMMARY OF THE INVENTION

It is an object of the present invention to provide a vector processing apparatus having a high processing speed, which can expand the degree of parallel operation of scalar and vector processors.

The vector processing apparatus according to one embodiment of the present invention comprises a scalar processor (SP) for executing a scalar instruction, a vector processor (VP) for executing a vector instruction, and a plurality of registers which can be accessed by the both processors. The scalar instruction includes an order assurance instruction for assuring an order of execution, and the order assurance instruction has a field to specify the register. The vector instruction has a field to specify a register. Wait control means withholds or enables execution of an instruction in the scalar or vector processor depending on the set or reset state of the register specified by the field of the instruction, and sets or resets the register specified by the field of the instruction as the instruction has been completed to control synchronization of instruction executions by the both processors.

BRIEF DESCRIPTION OF THE DRAWINGS

FIG. 1 is a time chart indicating decoding of a scalar/vector hybrid instruction, FIGS. 2(A) and 2(B) are two kinds of representations of vector instructions, FIG. 2(C) is a detailed format of the FIG. 2(B).

FIG. 3 is a block diagram showing one embodiment of the present invention,

FIGS. 4 and 5 are block diagrams showing portions of FIG. 3, and

FIG. 6 is a time chart for continuous inner product processing.

DESCRIPTION OF THE PREFERRED EMBODIMENTS

Prior to the explanation of the preferred embodiments, synchronization between the scalar processor and the vector processor is explained in connection with instruction execution control and data exchange.

Figure 1:
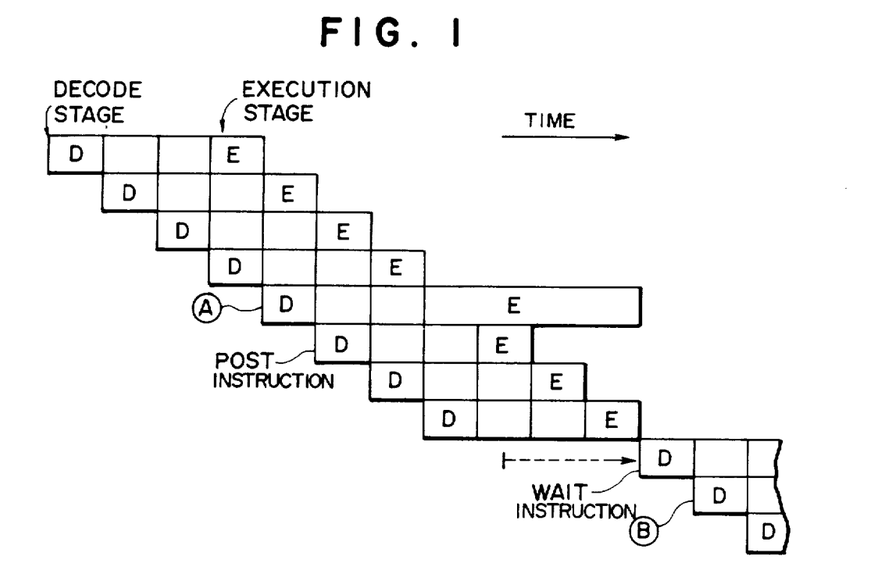

In a scalar processor, since the instructions are decoded serially, a condition that one event should occur later than another event can be met by introducing a scalar execution control instruction separate from a scalar operation instruction. Such a scalar execution control instruction includes a post instruction and wait instruction. The post and wait instructions are effective where the instructions are serially decoded as shown in FIG. 1 and includes a long execution stage instruction. In FIG. 1, the order of instructions Ⓐ appearing before the post instruction and instructions Ⓑ appearing after the wait instruction is assured. Accordingly, this method is well adapted to the hybrid scalar/vector instruction system. It is not useful to apply the post and wait instructions to pure scalar processing in which instruction execution stages do not overlap. On a other hand, in the vector processor, a plurality of instructions each requiring a plurality of resources for execution are parallelly executed. If the execution of those instructions is controlled only by the post and wait instructions, which control is based on the order of appearance of the instructions, the instructions are executed in the order of decoding of the vector instructions. Thus, even if one vector instruction is logically ready for execution, the execution may be delayed if it happens to appear after the wait instruction. The defect is caused because the vector processing, which is essentially parallel, is controlled by the serial vector instruction decoding method. If the order of execution of the vector instructions is exchanged within a limit that no logical discrepancy occurs in order to avoid the above problem, the post and wait instructions no longer make sense. Accordingly, it is not appropriate to introduce the post and wait instructions into the vector instruction system.

In order to assure the order between the vector instructions and between the vector instruction and the scalar instruction, the vector instruction must include conditions to start execution of the instruction and to determine the status of the processor at the end of the instruction execution. A concept of the status of the processor has been used in a conventional computer in the form of a condition code. In the conventional computer, however, since the instructions are serially decoded, there is only one condition code. In order to enhance the degree of parallel processing of the processor, it is necessary to decode the instructions by a plurality of decoders. This means that a plurality of condition codes must be provided. Such condition codes are hereinafter referred to as status codes (SC), and registers which hold status code are referred to as SC registers (SCR).

The SCR's can be referred to by both the scalar processor and the vector processor. A read timing and a write timing must be different in phase to prevent writing and reading from occurring simultaneously. In the simplest format of the SC, non-completion and completion of the instruction execution are represented by "0" and "1", respectively. Information as to exceptions having occurred during the instruction execution may also be included. The more the number of types of such information is, the more can the processor be controlled in detail. On the other hand, the more the processor is controlled in detail, the more the amount of hardware increases and machine cycle must be slowed down because of a restriction on packaging. The following four information items are represented by the SC.

| ① | Instruction is not executed | "0" |
| ② | Instruction is normally executed | "1" |
| ③ | Interruption occurs during instruction execution | "2" |
| ④ | Instruction is not operational (executable) | "3" |

Four processing timings of the processors are set for the above information.

| ① | SCR read timing | $T_0$ |
| ② | SCR write timing | $T_1$ |
| ③ | Interrupt check timing | $T_2$ |
| ④ | SCR operation timing | $T_3$ |

The above classification is not absolute, but more or less number of classes may be used depending on an intended processing. It is essential that a plurality of SC's each having a plurality of status are provided and the processor has a plurality of timing phases (e.g. multi-phases).

Figure 2:
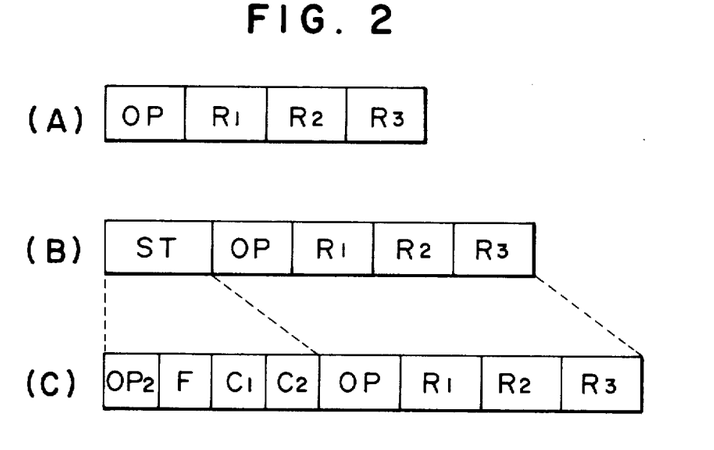

A format of the vector instruction is now considered. A conventional vector instruction comprises an operation code (OP) and operand fields (R1, R2, R3) as shown in FIG. 2(A). The instruction may have more operand fields depending on the type of processor. However, the instruction does not have a field (ST) for defining the condition to execute the instruction and the processing to be taken when the instruction execution has been completed or interrupted. In order to effect the interprocessor control by the SC, a vector instruction having a field ST as shown in FIG. 2(B) is introduced.

For the purpose of starting the instruction execution and managing the processing at the end of the execution, the field ST may have only two fields. With this format, however, it is difficult to execute a desired instruction after two or more events have been completed. In order for the instruction to be used for such complex events, a plurality of sub-fields are defined in the field ST as shown in FIG. 2(C). FIG. 2(C) shows an SC operation definition field (OP2), an SC number field (F) for holding information at the end of the instruction execution and fields (C1, C2) for indicating conditions to start the instruction execution. This format is not absolute.

In the processor, the operation must be completed once it has been started, but the SCR operation defined by the field OP2 of FIG. 2(C) is not completed unless the instruction defined by the field OP has been executed. In this instruction architecture, no-operation in the OP field does not mean that the processor carries out no significant data processing, but positively means that it controls the execution of the instructions.

The data transfer between the processors is now explained. Where a main storage is shared by a plurality of processors, data can be transferred through the main storage, but in order to allow faster data transfers, a register which can be referred to by both the vector processor and the scalar processor is provided. If a scalar architecture has been used and a vector architecture is added to the scalar architecture, the register cannot be referred to in the operand of the scalar operation instruction. The vector/scalar processor data transfer register appears to be a high speed memory to the scalar processor, and only the data transfer instruction from the floating point register and the fixed point register is aded to the scalar instruction architecture as a basic operation. In the vector instruction architecture, however, it may be directly described as the operand of the vector operation. Such interprocessor data transfer register is hereinafter called a scalar register (SR).

Characteristics of the hardware and the instruction format of the vector processing apparatus of the present invention have been described and outlined. Execution of the program under such an architecture is explained below. Ex. 1: Synchronization of scalar and vector processors in an inner product calculation.

In and inner product calculation, the SR and the SCR are utilized to reduce synchronous defects. For example, for the following FORTRAN code,

```
      S = 0.0
      DO 100 I = 1, N
  100 S = S + A(I) * B(I)
      T = S + 273.0
``` the scalar code is

| ① | move | SR0 ← D'0.0' |
| ② | post | [0, N, N] |
| ③ | wait | [N, 1, N] |
| ④ | move | FPR0 ← SR0 |
| ⑤ | add | FPR0 ← FPR0 + D'273.0' | and the vector code is

| 1 | vector load | VR0 ← A, [N, N, N] |
| 2 | vector load | VR1 ← B, [N, N, N] |
| 3 | inner product | SR0 ← SR0 + VR0 * VR1[1, 0, N] |

It is assumed that the post and wait instructions are added to the scalar instruction architecture. The parentheses [ ] in the operands of the scalar and vector instructions define the condition to examine the SCR and the method for setting the SCR after the instruction has been executed. A first term in [ ] indicates the SCR number (corresponding to the field F in FIG. 2(C)) in which the condition after the instruction execution is to be set, and second and third terms indicate the SCR numbers necessary for the instruction execution (corresponding to the fields C1 and C2 in FIG. 2(C)). When the SCR number is N, the processing is carried out without regard to the status of the SCR. In the scalar code shown above, after the move instruction ① has been executed, the post instruction ② sets an end code into the SCR0, the scalar processor executes the next wait instruction ③ but, since the SCR1 has not been set, the scalar processor stands by at the wait instruction. On the other hand, in the vector processor, the vector load instructions ① and ② are executed without degard to the SCR, VR stands for vector register. The inner product instruction is executed after the scalar processor has cleared the SR0 of the move instruction ①. Whether the vector load instructions ① and ② have been executed or not is not checked. In the vector processor, chaining is performed by the VR numbers, so that the condition that the operation is carried out after the data has been fetched is met.

When the inner product instruction has been executed and the product is set in the SR0, the SCR1 is set. As a result, the stand-by state of the scalar processor by the wait instruction is released, and the result of the inner product calculation by the vector processing is read from the SR0 and written into the floating point register FPR0 for addition by the scalar processor. In this manner, the synchronous defects in the synchronization between the scalar and vector processors can be controlled to be minimized, by the effect of providing the SCR and SR. In the same period, various processings which have no connection with the inner product calculation may be inserted between the post instruction ② and the wait instruction ③ of the scalar code to carry out other operations during the wait time of the scalar processor, so that the performance of the processor is enhanced.

Ex. 2: End-of-two-events information is used.
For the following FORTRAN code,

```
        S = 0.0
        T = 0.0
        DO 100 I = 1, N
        S = S + A(I) * B(I)
100     T = T + C(I)
        U = S/T,
``` the scalar code is:

| | | |
|---|---|---|
| ① | move | SR0 ← D'0.0' |
| ② | post | [0, N, N] |
| ③ | move | SR1 ← D'0.0' |
| ④ | post | [1, N, N] |
| ⑤ | wait | [N, 2 and 3] |
| ⑥ | move | FPR0 ← SR0 |
| ⑦ | move | FPR2 ← SR1 |
| ⑧ | dicide | FPR0 ← FPR0/FPR1 |
| ⑨ | store | FPR0 ← 'U', | and the vector code is:

| | | |
|---|---|---|
| ① | vector load | VR0 ← 'A', [N, N, N] |
| ② | vector load | VR1 ← 'B', [N, N, N] |
| ③ | inner product | SR0 ← SR0 + VR0 * VR1, [2, 0, N] |
| ④ | vector load | VR2 ← 'C', [N, N, N] |
| ⑤ | summation | SR1 ← SR1 + VR2, [3, 1, N], |

The operation of the processing aparatus is as follows. The scalar processor executes the instructions from ① to ④. The SCR0 and SCR1 are set, and the processor stands by at the wait instruction 5 11. In the vector processor, the vector load instructions ① and ② are executed without regard to the SCR. The inner product instruction ③ is not executed until the SCR0 is set. Since the vector load instruction ④ is independent from the SCR, it is possible to arrange the instruction decoding by the vector processor such that the vector load instruction ④ is executed without waiting for the execution of the inner product instruction ③. In this manner, in the vector processor, the performance can be enhanced by properly designing the instruction decoder. The summation instruction ⑤ is executed after the SCR1 has been set, and the SCR3 is set after the execution. In the vector processor, it is not guaranteed that the instructions are executed in the order of their appearance because of reversal of the order of execution of the vector instructions and the indefinite length of the operation time. In the present example, it is not certain which one of the SCR2 and the SCR3 is first set. Accordingly, in order for the scalar processor to process by utilizing the results on the SR0 and the SR1, it must wait by ANDing the SCR2 and the SCR3. This is carried out by the wait instruction ⑤. In this manner, when the processor waits for the completion of two events, the synchronous defects between the processors can be minimized by utilizing the SCR and the SR.

When the data is to be transferred between the scalar processor and the vector processor via the main storage, they are transferred in the same manner as that of the SR. The data dependency between the vector load instruction and the store instruction in the vector processor can be freely set by the SCR.

The processing in case of an exception caused in the instruction is now explained. The SCR set instruction in the scalar processor includes only the post instruction and the wait instruction and no access exception nor arithmetic exception takes place. Since the exceptions to be controlled in a user program are the access exception and the arithmetic exception, the processing in the vector processor in case of those two exceptions is explained. It is assumed that an access exception or arithmetic exception takes place when the vector processor has decoded the vector instruction and caused an ALU or a memory requestor (hereinafter called a resource) in the vector processor to carry out the processing instructed by the instruction. The exception information is immediately reflected to the SCR. Since the SCR is always checked by a multi-phase timing, the scalar processor can shift the control to the interrupt processing routine immediately after the occurrence of the exception by using the exception information on the SCR. In this system, the instruction for which the exception has taken place can be identified, but the vector element number at the time of occurrence of the exception cannot be determined and the reovery for the exception cannot be carried out by the hardware. However, by modifying the software, particularly a compiler, the content of the array for vector processing is saved into the system-area in main storage prior to execution of vector instructions.

The vector job is processed by the unit of vector instructions. If the exception occurs in one unit of vector instructions, the array, which is refered to by the vector processor, is abandoned.

Then, using the interrupt routine in the operating system, the array space is recovered, i.e., the previous information in the system-area is transfered into the array space.

Parameters necessary to execute the interrupt processing routine are the number of the arrays, the vector length, and the starting locations of the arrays.

The parameters are set on the specified SR at the initiation of the vector job. In this manner, even if the exception takes place during the vector processing, the control can be returned by the interrupt processing routine to the state before the initiation of the vector processing. When the scalar processor stands by by the SCR designated by the operand of the wait instruction, it is considered in the present processing apparatus that the wait instruction is being prosecuted, the shifting of the control to the interrupt processing routine can be performed by updating the next instruction area (NIA) of the program status word as is done in the conventional scalar processor. After the control has been returned to the status before the initiation of the vector processing, the processing corresponding to the vector processing is performed by the scalar instruction code. The processing of the exception which takes place in the scalar processor is not explained here but it may be processed by a supervisor of an operating system. Through a series of processings described above, the exception which took place at any element during the vector processing can be controlled at the level of the user program by calling the supervisor in the interrupt routine.

An instruction to release the stand-by state of the scalar and vector processors cannot be issued if an invalid code is generated due to a bug in the compiler or if the code is destroyed by an overrun of the user program. In such a circumstance, it is necessary to forcibly cancel the user job after lapse of a predetermined time period. To this end, a counter in each of the processors is started when the processor goes to the stand-by state. The counter is counted up at the machine cycle pitch and generates a carry when the count exceeds a predetermined number. The carry is used as a trigger signal to a logic circuit for updating the program status word (PSW) so that the control is shifted to the interrupt processing routine.

Figure 4:
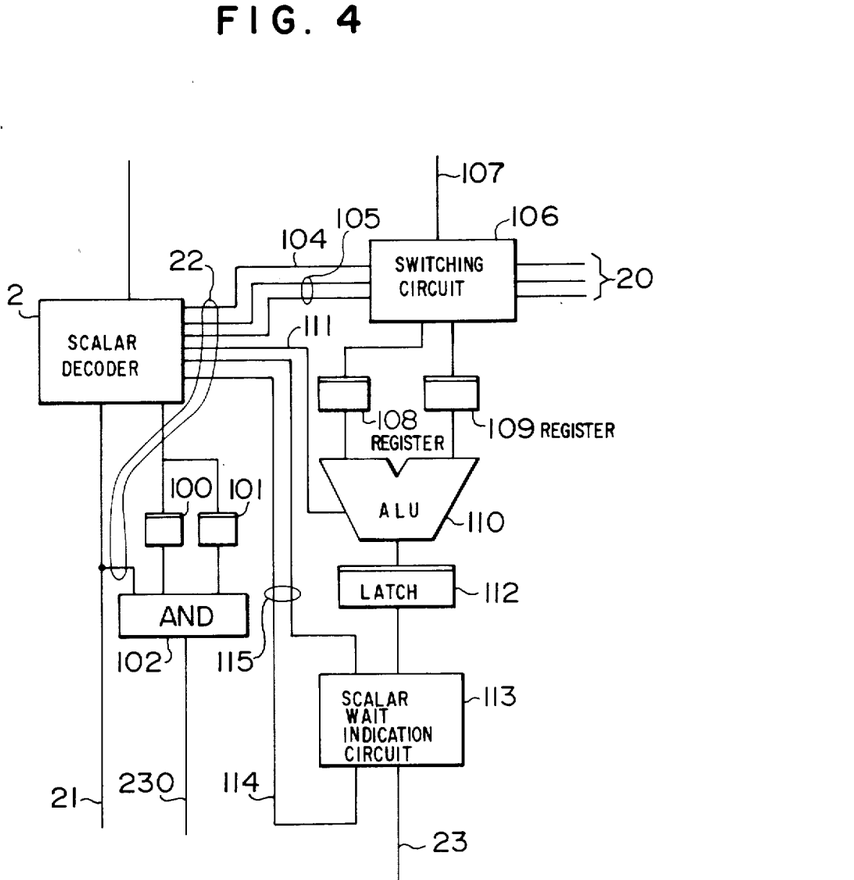
Figure 5:
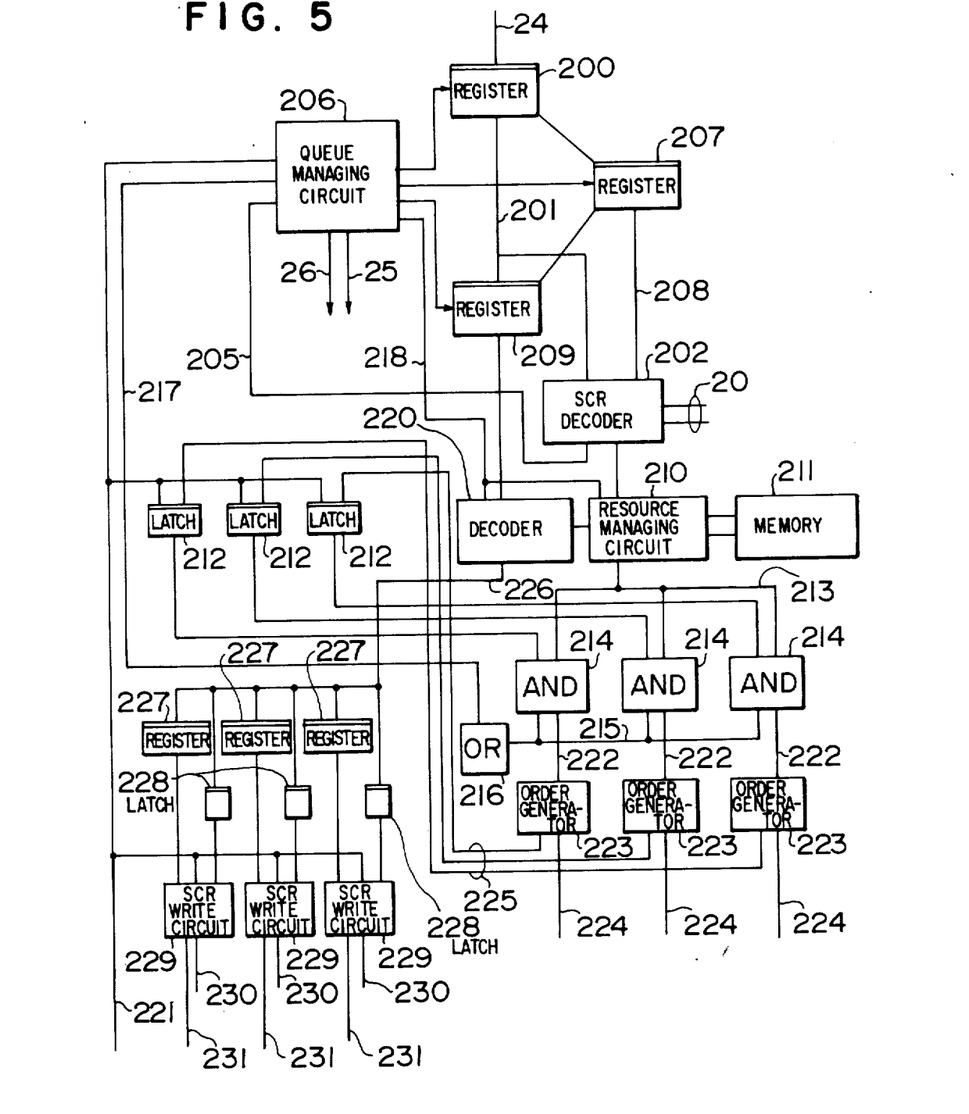

One embodiment of the present invention is now explained with reference to FIGS. 3, 4 and 5.

Figure 3:
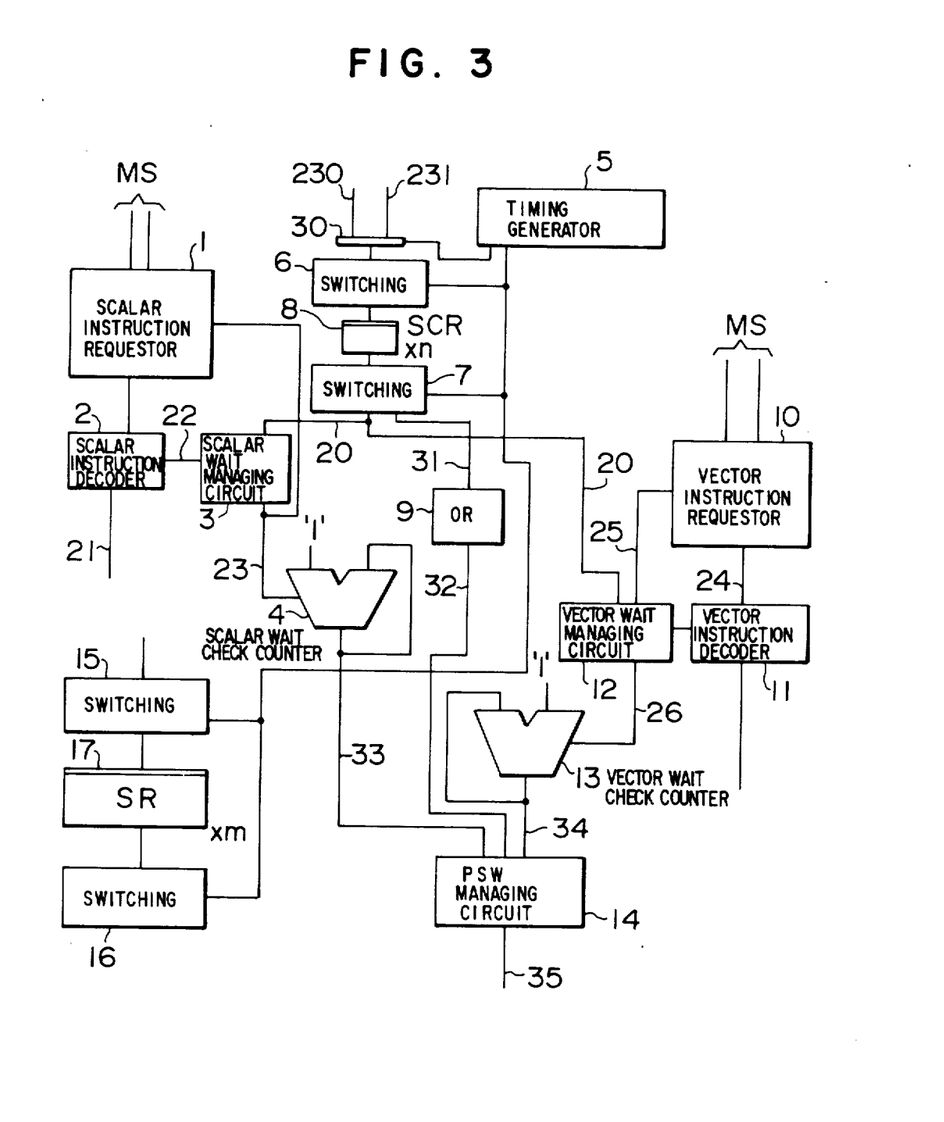

In FIG. 3, numeral 1 denotes a scalar instruction requestor, numeral 2 denotes a scalar instruction decoder, numeral 3 denotes a scalar processor wait managing circuit, numeral 4 denotes a scalar wait check counter, numeral 5 denotes a timing generator, numerals 6 and 7 denote switching circuits, numeral 8 denotes a status code register (SCR), numeral 9 denotes an OR circuit, numeral 10 denotes a vector instruction requestor, numeral 11 denotes a vector instruction decoder, numeral 12 denotes a vector processor wait managing circuit, numeral 13 denotes a vector wait check counter, numeral 14 denotes a program status word managing circuit, numerals 15 and 16 denote switching circuits and numeral 17 denotes a scalar register (SR). There are a plurality of SCRs 8 and SRs 17 and they are indicated by Xn and Xm, respectively.

When the vector processing apparatus is started, the scalar instruction is fetched by the scalar instruction requestor 1. The processing of the vector processor is started by a start vector processor instruction and a set-up instruction in the scalar instruction fetched from the main storage (MS). A logic circuit for performing the above operation is not directly related to the scalar/vector processor synchronization which is a substance of the present invention, and so it is omitted in FIG. 3. In the following description, it is assumed that both the scalar processor and the vector processor are in operation. (The stand-by or wait status is considered to be in operation.)

As the scalar instruction is decoded by the decoder 2, the scalar instruction other than the post and wait instructions instructs the initiation of the scalar processing to the logic circuits in the scalar processor through a path 21 without checking the control condition for decoding the instruction, such as SCR.

The operation for the post and wait instructions is explained with reference to FIG. 4 which shows a detail of a scalar processor wait managing circuit shown in FIG. 3. The logic circuits and the paths which are common to FIGS. 3 and 4 are designated by like numerals.

As the post instruction is decoded and if the SCR number is designated, the decoder 2 sets that number into a register 100 of the scalar processor wait managing circuit 3, and also sets "1" into a latch 101. If "N" is designated by the SCR number, "0" is set into the latch 101. In this case, the content set into the register 100 is not assured. Since the post instruction is the set SCR instruction for synchronization, no logic for checking the SCR to start the execution of the instruction is provided. However, since it may be desired to invalidate the post instruction for debugging the program, a logic to invalidate the set SCR instruction is provided. The contents set in the register 100 and the latch 101 are ANDed with the post instruction start information on the path 21 by an AND circuit 102 at the next timing, and an output of the AND circuit 102 is sent out to a path 230 as SCR write information.

As shown in FIG. 3, the switching circuit 6 which functions as a write circuit is connected to the input of the SCR 8, and the switching circuit 7 which functions as a read circuit is connected to the output of the SCR 8. The switching circuits 6 and 7 are connected to the timing generator 5 and controlled by timing signals T0 (SCR read), T1 (SCR write), T2 (SCR exception information search) and T3 (SCR operation) generated by the timing generator 5. The SCR write information supplied through the path 230 is sent to the SCR 8 through the selector 30 and the switching circuit 6 to set the SC of the SCR number designated by the SCR write information to "1".

As the wait instruction is decoded, the decoder 2 sends the read request to a path 104 and the read SCR number to a path 105 (dual line), which corresponds to the path 22 shown in FIG. 3. The switching circuit 106 functions to time divide the path 20. The timing signals T0–T3 are supplied from the timing generator 5 through a path 107. The switching circuit 106 sends the read SCR number to the switching circuit 7 and reads out the content of the designated SCR at the timing T0. The information read from the SCR is set into registers 108 and 109. This information is processed by an ALU 110 at the timing T3. The type of operation is designated by the decoder 2 by the content of the field OP2, through a path 111. The operation result is held in a latch 112. It indicates whether the wait instruction is to continue the scalar wait status or not.

On the other hand, the decoder 2 starts a scalar wait indication circuit 113 through a path 115 simultaneously with the start of the wait instruction. The scalar wait indication circuit 113 indicates to the decoder 2 through the path 114 that the wait instruction is being executed, if the information in the latch circuit 112 indicates to continue the wait status. If the information of the latch 112 indicates to release the wait status, the circuit 113 indicates the end of wait instruction through the path 114.

When the wait instruction is decoded by the decoder 2, the scalar processor wait managing circuit 3 starts the scalar check counter 4 (FIG. 3) through the path 23 and causes the scalar instruction requestor 1 to interrupt the scalar instruction fetching.

On the other hand, if the continuation of the wait status is reported through the path 114, the wait instruction remains in the register (not shown) in the decoder 2 and the scalar instruction decode pipeline is stopped. When the wait status is released through the path 114, the decoder 2 sets the SCR set number at the end of the instruction execution into the register 100, and sets "1" into the latch 101. If the SLC number is not designated, "0" is set into the latch 101. The instruction execution information and the information in the register 100 and the latch 101 are ANDed in the AND circuit 102, which produces a SLC write signal which is sent out to the path 230.

When the latch 112 indicates the release of the wait status, the scalar processor wait managing circuit indicates the release of interrupt of scalar instruction fetching to the scalar instruction requestor 1 through the path 23.

The decoding of the vector instruction and the start of the execution of the vector instruction are explained with reference to FIGS. 3 and 5.

The vector instruction is fetched from the main storage by the vector instruction requestor 10 of FIG. 3 and it is sent to the decoder 11. FIG. 5 shows a detail of a logical configuration of the decoder 11 and the vector processor wait managing circuit 12 of FIG. 3. The vector processor wait managing circuit 12 comprises an SCR decoder 202, a queue managing circuit 206, a register 227, a latch 228 and an SCR write managing circuit 229, and the vector instruction decoder 11 comprises the other circuits shown in FIG. 5. The vector instruction is temporarily stored in the register 200 and it is sent through a path 201 to the SCR decoder 202 which reads out the content of the SCR designated by the operand of the vector instruction. The SCR decoder 202 is identical to the logic of FIG. 4 except that the queue managing circuit 206 corresponds to the scalar weight indication circuit 113. The SCR decoder 202 reads out the content of the designated SCR and processes it. If the vector instruction is determined to be unexecutable by the SCR decoder 202, this condition is reported to the queue managing circuit 206 through a path 205.

When the queue managing circuit 206 receives the report of and unexecutable instruction, it transfers the vector instruction in the register 200 to the register 207. While only one register 207 is shown in FIG. 5 for the purpose of simplicity, it is not limited to one register, but a plurality of such registers may be provided to expand the range of reversal of the order of instruction execution. After the unexecutable vector instruction has been transferred to the register 207, a subsequent vector instruction is stored into the register 200 by the instruction requestor 10 (FIG. 3). The unexecutable vector instruction is transferred from the register 200 to the register 209 through the path 205, and a copy of the instruction in the SCR decoder 202 is transferred to the resource managing circuit 210.

The timing of the SCR decoder 202 is divided into Tx and Ty. At the timing Tx, whether the instruction in the register 207 is executable or not is checked through the path 208, and at the timing Ty, the instruction in the register 200 is checked. The vector instruction which was determined to be unexecutable by the SCR decoder 202 is transferred to the register 207, and it is checked whether it is executable or not at the timing Tx. If it is executable, it is reported to the queue managing circuit 206 and the instruction is transferred to the register 209. At the timing Ty, whether the instruction in the register 200 is executable or not is checked by comparing the SCR number which the vector instruction in the register 207 uses with the SCR reference information of the instruction. If the instruction in the register 200 is executable, the queue managing circuit 206 transfers the instruction to the register 209 if there is no vector instruction in the register 209. If there is a vector instruction in the register 209 and there is no instruction in the register 207, the instruction is transferred to the register 207. If there are instructions in both registers 209 and 207, the instruction is not transferred between the registers even if the instruction in the register 200 is executable. Under this control, the vector instruction is always terminated in a normal condition or with the detection of exception and the vector processor never deadlocks. If the vector instruction in the register 200 is unexecutable, it is reported to the queue managing circuit 206 through the path 205 at the timing Ty. When the queue managing circuit 206 receives the report, it interrupts the vector instruction requestor 10 through the path 25. It also starts the vector check counter 13 (FIG. 2) through the path 26.

In this manner, the condition on the SCR information of the operand of the vector instruction can be examined. A logic to examine the information on the resource vector register in the vector processor for the executable vector instruction is explained below.

The resource managing circuit 210 determines the resource number necessary to execute the vector instruction by referring to the circuit 211 which stores the type of instruction. The use status of the resource is held in the status latch 212 for each resource. In FIG. 5, three latches 212 for three resources are shown for the purpose of simplicity. The number 3 is not significant and more or less number of latches are used to realize the performance required by the vector processor. In FIG. 5, the logic to examine the status of the vector register is omitted. It can be realized by the same logic as that which examines the status of the resource. The status latch 212 may be provided for each vector register, and it is set to "1" when the vector register is set and reset to "0" when the instruction which uses the vector register terminates.

When the resource status managing circuit 210 determines the resource to be used by the vector instruction, it sends a signal to the AND circuit 214 through the path 213. The path 213 is a bus. The AND circuit 214 logically ANDs that signal with the output of the status latch 212 to determine whether the resource is available or not. The results, which correspond to the resource, are sent out to the path 215 and they are logically ORed by the OR circuit 216 so that whether the instruction is executable or not is reported to the queue managing circuit 206, which transfers the vector instruction in the register 209 to the decoder 220 through the path 218. The vector instruction in the resource managing circuit 210 corresponding to the register 209 is erased. If the AND circuit 214 determines that the instruction is unexecutable, the information is supplied to the queue managing circuit 206 through the paths 215 and 217. The queue managing circuit 206 instructs the decoder 220 and the resource managing circuit 210 through the path 218 to hold the current status. The vector instruction remains in the register 209. As a result, the vector instruction is not transferred to the register 209 even if the vector instruction in the register 207 or 200 is determined to be executable by reading and operation of the SCR information. In this case, the queue managing circuit 206 interrupts the vector intruction fetch through the path 25. The interrupt continues until a vacant resource status is reported from the resource in the vector processor through the path 221 to reset the status latch 212 and the AND circuit 214 determines that the instruction in the register 209 is executable.

When the AND circuit 214 determines that the instruction is executable, the information is sent through the path 222 to an order generator 223 which generates an order necessary to start the resource. The generator 223 generates the order necessary to start the resource and sends it to the resource through the path 224. It also sets the status latch 212 through the path 225.

On the other hand, when the vector instruction in the register 209 is executable, the information is sent to the decoder 220 through the path 218, which sends the SCR number to be set upon completion of the instruction execution or information to suppress setting to the register 227 and the latch 228 through the path 226. The registers 227 and the latches are provided one for each resource, respectively. When the execution of the vector instruction is completed, it is reported to the SCR write managing circuit 229 through the path 221. When it is reported, the content of the latch 228 is examined, and if it is SCR write, the information in the register 227 is sent out to the path 230. If the content of the latch 228 is not writable, no information is sent out to the path 230. If the exception information is reported to the path 221, the SCR write managing circuit 229 reports the exception information to the SCR designated by the register 227 irrespective of the content of the latch 228, through the path 231.

The exception processing by the vector processing apparatus of the present invention is explained with reference to FIG. 3.

It is assumed that as the instruction execution is completed, the SCR write processing is reported through the path 230 and the exception processing is carried out for one timing period through the path 231. The timing generator 5 subdivides the one timing period so that the SCR write processing at the completion is carried out at a timing T1 and the write processing for the exception is carried out at a timing T3. The selector 30 selects the path 230 at the timing T1 and selects the path 231 at the timing T3. The selected information is sent to the SCR write circuit 6 which sets the end information or the exception information into the corresponding SCR.

The SCR read circuit 7 is activated at timings T0 and T2, and connects paths necessary for reading at the timing T0 and for the exception processing at the timing T2. Since the SCR read processing has already been explained above, the exception processing is explained here.

At the timing T2, the SCR read circuit 7 connects the SCR to the path 31. The OR circuit 9 examines all SCR's and if the exception information exists in at least one of the SCR's, it is considered that the exception has been detected in the processing apparatus and a signal is sent out to the path 32.

If the wait status occurs in both the scalar processor and the vector processor of the processing apparatus, check counters 4 and 13 are started through the paths 23 and 26, respectively. The contents of the counters are cleared to "0" when they are started, and they are counted up at every machine cycle. When the scalar or vector instruction is started and the wait status of the processor is released through the path 23 or 26, the counting-up of the counter is stopped.

If the wait status of the processor continues so long that it exceeds a data width of the counter, the counter generates a carry, which is supplied to the logic circuit 14 through the path 33 or 34. The logic circuit 14 generates the order information for the exception information in the SCR on the path 32 or the processor wait error status on the paths 33 and 34 and sends it to the path 35. Then, the program status word is updated by using that information. Since this logic has no direct connection to the synchronization of the processors, it is not explained here in detail.

The SR 17 which transfers data between the scalar and vector processors is explained below. Like the SCR, the reading and the writing of the SR are controlled by the timings T0-T3. Since the timings for the exception processing and the SR operation are not necessary, those timings are defined as non-processing timings.

If the writing occurs simultaneously in the registers or latches of the same number, the operatons of the SR and the SCR are not assured. However, it is easy to control the execution of the program to prevent simultaneous write access from occuring.

In accordance with the present invention, the scalar processor and the vector processor can be parallelly operated in the inner product calculation of the short vector length (3 to 3-order and 4 for 4-order) which frequently appears in the energy gradient calculation in the field. Namely,

```
    X1 = 0.0
    X2 = 0.0
    X3 = 0.0
    DO 100 I = 1, 3
    X1 = X1 + DXY(I) * DYZ(I)
    X2 = X2 + DYZ(I) * DZX(I)
100 X3 = X3 + DZX(I) * DXY(I)
    X4 = X1 * X1 + X2 * X2 + X3 * X3
``` is converted as follows.

| | | Scalar code: |
|---|---|---|
| ① | move | SR0 ← D`0.0` |
| ② | post | [0, N, N] |
| ③ | move | SR1 ← D`0.0` |

-continued

|     |               |                                |
| --- | ------------- | ------------------------------ |
| ④   | post          | [1, N, N]                      |
| ⑤   | move          | SR2 ← D'0.0'                   |
| ⑥   | post          | [2, N, N]                      |
| ⑦   | wait          | [N, 3, N]                      |
| ⑧   | move          | FPR0 ← SR0                     |
| ⑨   | multiply      | FPR0 ← FPR0 * FPR0             |
| ⑩   | wait          | [N, 4, N]                      |
| ⑪   | move          | FPR2 ← SR1                     |
| ⑫   | multiply      | FPR2 ← FPR2 * FPR2             |
| ⑬   | add           | FPR0 ← FPR0 + FPR2             |
| ⑭   | wait          | [N, 5, N]                      |
| ⑮   | move          | FPR2 ← SR2                     |
| ⑯   | multiply      | FPR2 ← FPR2 * FPR2             |
| ⑰   | add           | FPR0 ← FPR0 + FPR2             |
| ⑱   | store         | FPR0 ← 'X4',                   |

Vector code:

|     |               |                                |
| --- | ------------- | ------------------------------ |
| ①   | vector load   | VR0 ← 'DXY', [N, N, N]         |
| ②   | vector load   | VR1 ← 'DYZ', [N, N, N]         |
| ③   | inner product | SR0 ← SR0 + VR0 * VR1, [3, 0, N] |
| ④   | vector load   | VR2 ← 'DYZ', [N, N, N]         |
| ⑤   | vector load   | VR3 ← 'DZX', [N, N, N]         |
| ⑥   | inner product | SR1 ← SR1 + VR2 * VR3, [4, 1, N] |
| ⑦   | vector load   | VR4 ← 'DZX', [N, N, N]         |
| ⑧   | inner product | SR2 ← SR2 + VR4 * VR0, [5, 2, N] |

Figure 6:
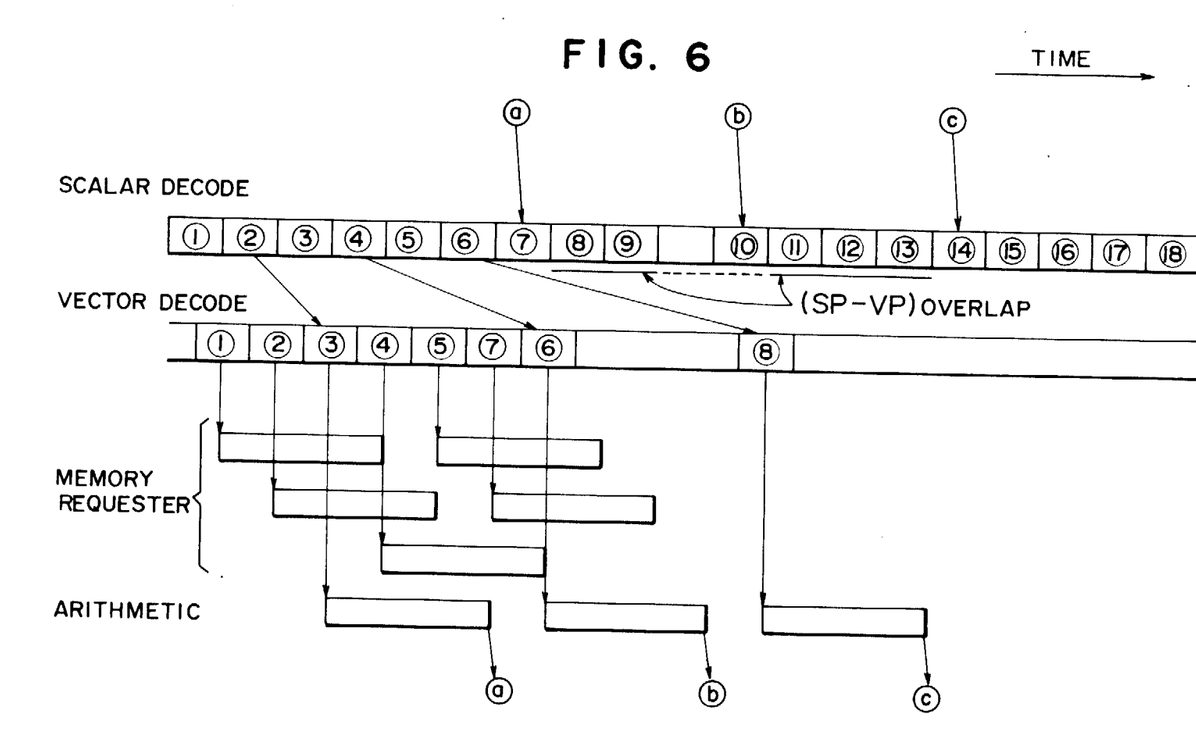

It is assumed that there are at least three memory requestors and the vector instructions ② and ④ can be parallelly executed. FIG. 6 shows a time chart for the scalar instruction decoding and the vector instruction decoding of the vector processing apparatus, and the memory requestors and the ALU's. It is assumed that the vector length is 3. In FIG. 6, the columns of the scalar and vector decodings are divided into machine cycles. Numerals in the respective divisions correspond to the lefthand sequence numbers in the instruction sequence. Arrows from the scalar decode columns to the vector decode columns indicate functions of the post instruction. Arrows from the vector decode columns to the resources in the vector processor indicate start instructions to the respective resources. The resources shown by solid line blocks indicate those resources which are processing data. Arrows from the ALU's to the scalar decode columns indicate the wait release instructions from the vector processor. FIG. 6 shows the parallel operations attained by the synchronous control of the vector processor by (SP-VP) overlap. The (SP-VP) overlap portion becomes longer as the vector length is longer. (For example, scalar decode columns 15–18.) Accordingly, the performance of the vector processing apparatus is improved.

We claim:

1. A vector processing apparatus comprising:
a main storage for storing scalar instructions, vector instructins and data;
a scalar processor connected to said main storage for executing the scalar instructins;
a vector processor connected to said main storage and said scalar processor for executing the vector instructions;
memory means having a plurality of memory locations for indicating status of completion of vector operations;
said scalar processor including first requestor and decode means for fetching the scalar instruction from said main storage and decoding the scalar instruction for execution, said scalar instructions each having an order assurance instruction to assure an order of execution of the scalar, and said order assurance instruction having a field for designating a memory locaton of said memory means;
said vector processor including second requestor and decoder means for fetching the vector instruction from said main storage and decoding the vector instruction for execution, said vector instructins each having a field for designating a memory location of said memory means; and
first and second wait managing means for controlling execution of scalar instructions and vector instructions, respectively, each of said first and second wait managing means causing a respective one of said first and second requestor and decode menas to assume a wait status or an enable status in accordance with a set or reset status of the memory location of said memory means designated by a respective one of said order assurance instruction and said vector instruction, and effecting setting or resetting of the memory location of said memory means designated by said field in response to termination of operation on a respective one of said order assurance instruction and said vector instruction.

2. A vector processing apparatus according to claim 1 wherein said vector instruction field includes first and second fields, and said first and second wait managing means each includes means for setting or resetting the memory location designated by said first field and reading out the content of the memory location designated by said second field.

3. A vector processing apparatus according to claim 2 wherein said vector instruction field includes a third field for designating an operation between contents of a plurality of memory locations designated by said second field, and said first and second wait managing field each includes operation means for carrying out the operation designated by said third field for the contents of the memory locations.

4. A vector processing apparatus according to claim 1 wherein said second requestor and decode means includes register means for holding a plurality of vector instructions, and said second wait managing means includes means for reading out the contents of the memory locations designated by the fields of the vector instructions,
whereby one of the executable vector instructions in the register means is executed.

5. A vector processing apparatus according to claim 1, wherein said memory means stores in said plurality of memory locations, conditions on completion of respective vector instructions fetched in said vector processor.

6. A vector processor apparatus according to claim 1, wherein said first and second wait managing means are controllably accessible to said memory means independently from each other.

* * * * *